United States Patent [19]

Mitchell et al.

[11] Patent Number: 4,563,332

[45] Date of Patent: Jan. 7, 1986

[54] LIQUID SAMPLING APPARATUS WITH RETENTION MEANS

[75] Inventors: Vance C. Mitchell, Irvine; Thomas A. Safstron, Orange, both of Calif.

[73] Assignee: ICL Scientific, Inc., Fountain Valley, Calif.

[21] Appl. No.: 489,030

[22] Filed: Apr. 27, 1983

[51] Int. Cl.$^4$ .......................... G01N 1/10; G01N 1/18

[52] U.S. Cl. .................................. 422/100; 73/863.21; 73/864.01; 422/102

[58] Field of Search .......................... 422/102, 72, 100; 210/927; 73/864.02, 863.21, 864, 864.01; 128/764

[56] References Cited

U.S. PATENT DOCUMENTS 3,366,103 1/1968 Keller ................................. 128/764

4,022,576 5/1977 Parker .

4,279,863 7/1981 Friehler ............................... 422/102

4,283,289 8/1981 Meyst et al. .................... 210/927 X 4,308,028 12/1981 Elkins ............................ 422/102 X

*Primary Examiner*—Arnold Turk

*Attorney, Agent, or Firm*—Memel, Jacobs, Pierno, Gersh & Ellsworth

[57] ABSTRACT

An apparatus for preparing a sample of liquid for examination and analysis. The apparatus includes a tube closed at one end and open at the other, and a pipette dimensioned for insertion into the tube. The pipette has a sealing surface which is slightly smaller in diameter than the inside diameter of the tube. Protruding from the sealing surface is a rib which is aligned along the longitudinal axes of the pipette and which engages a portion of the inside wall of the tube to maintain the pipette in the tube.

11 Claims, 6 Drawing Figures

LIQUID SAMPLING APPARATUS WITH RETENTION MEANS

BACKGROUND OF THE INVENTION

This invention relates to laboratory testing procedures and, more particularly, to apparatus for preparing liquid samples of urine and the like for examination.

In the field of clinical testing, it is often important to isolate and accurately sample a specific volume of fluid. As an example, one type of routine medical test is an analysis of a patient's urine to determine the amounts of sugar, albumin, and solids present in the specimen. As part of this analytical procedure, microscopic studies are performed to determine the presence and amount of cellular elements such as erythrocytes, leukocytes, epithelial cells, casts, and crystals in the urine. In a standard procedure for making such determinations, a precise volume of urine is centrifuged to preferentially redistribute the cellular elements in the lower portion of a container tube, and then liquid from the lower portion is transferred to a slide for observation.

In obtaining samples for microscopic observation, it is important that the nature of the sample finally placed onto the the microscopic slide not be dependent upon the individual technique of the person who prepares the samples. To this end, an approach and apparatus was developed for isolating a precise volume of liquid at the bottom of a tube initially having a larger volume of liquid, with a pipette having a diametrically enlarged chamber that seals against the inner wall of the container so as to isolate the sample. After the seal is formed, the portion of liquid above the seal is decanted by inverting the tube and pipette with the seal intact. The tube and pipette are righted, and then after mixing the sample, a portion is drawn into the chamber for transferring to the slide. This technique has proved highly successful and popular in standardizing the microscopic urine testing procedure.

The above-described testing procedure has several drawbacks, however, particularly when used for large-scale laboratory testing wherein many samples are to be studied. Since the pipette is hollow and initially filled with air, it tends to float upwardly when placed into the liquid-filled tube, thereby breaking the seal between the outer portion of the chamber and the wall of the tube and allowing liquid circulation between the liquids being isolated from each other. Consequently, it is sometimes necessary to hold the pipette in place manually. Further, when the tube and pipette are inverted to decant the portion of the liquid to be removed, the pipette must be held in place manually to maintain the seal and thereby retain the small sample. With this constraint, it is impossible to decant multiple containers at one time, as for example by placing a large number of containers with inserted tubes into a rack and then partially inverting the rack to decant all of the containers at once. Finally, because the pipette must be held in place manually when decanting, it is possible that the hand may be splashed with a portion of the liquid being decanted, which is undesirable both hygenically and because of cross contamination of samples.

There therefore exists a need for apparatus which allows the standardized preparation of a urine sample for microscopic observation, but also provides for the positive retention of the seal between the tube and the container wall during sampling. Further, such apparatus should be economical to manufacture and should allow rapid processing of samples in large numbers with minimal variation of the technique now well established in laboratories worldwide. The present invention fulfills this need, and further provides related advantages.

SUMMARY OF THE INVENTION

The present invention provides an apparatus and method for preparing liquid specimens, wherein a sample for analysis and observation may be isolated from a larger volume of liquid conveniently and reproducibly. Variation in the sampling and observation due to differences in the laboratory technique is minimized, and the preparation of large numbers of samples may proceed rapidly. Further, the chances of inadvertent mixing of the liquid sample and the liquid to be decanted is minimized. With this invention, accurate, reproducible analysis of the components of urine and other samples is possible in a large scale, production line fashion.

The apparatus for preparing liquid specimens includes a tube for holding the liquid to be sampled and a pipette or other means for isolating and withdrawing a sample from a portion of the liquid. In accordance with the invention, the pipette or other means includes retention means for maintaining the seal between the pipette and the tube, thereby resisting the tendency of the pipette to float in the liquid and also holding the pipette in place when the container is inverted to decant the liquid to be discarded.

In a preferred embodiment following a standardized test procedure, 12 ml of liquid such as urine to be analyzed is placed in an generally cylindrical, but tapered centrifuge tube. After capping, the tube is centrifuged to cause migration of the solid elements to the liquid volume at the bottom of the container. The container is removed from the centrifuge, and a pipette having a specialized configuration is inserted. The pipette is hollow with an open lower end or stem, an upper end closed by a bulb, and a diametrically enlarged chamber adjacent the stem. The outer wall of the chamber includes a sealing surface which seals against a corresponding surface on the inner wall of the tube to isolate a liquid specimen at the lower end of the container, the liquid specimen preferrably being 1 ml in volume.

In a preferred embodiment, at least one outwardly projecting rib is provided on the wall of the chamber, the rib having a sufficiently great height that it frictionally engages the inner wall of the tube over a short range of axial movement of the pipette as the sealing surfaces are brought into contact. The wall of the chamber is of a relatively thin plastic construction, so that the contact between the rib and the inner wall of the tube flexes the wall of the chamber inwardly, thereby resiliently biasing the rib against the tube wall. In practice, it is found that, for conventionally sized apparatus having a chamber diameter of slightly less than $\frac{1}{2}$ inch, provision of a pair of diametrically opposed ribs, each of height of about 0.005 inches, is sufficient to hold the pipette in place with the sealing surfaces in contact, against the buoyant force tending to cause the tube to float upwardly, and also holds the tube in place with the sealing surfaces in contact when the liquid in the upper portion of the tube is decanted by partially inverting the tube.

It will be appreciated from the foregoing that the present invention represents an advance in the art of isolating and sampling liquid specimens, particularly where multiple samples must be prepared and evaluated. Where multiple samples are being prepared, a plurality of centrifuge tubes are placed into a rack, a pipette is inserted into each container to isolate a sample, the rack is partially inverted to decant the discarded portion, and then the samples are individually transferred to a slide for examination. Multiple samples may thereby be prepared rapidly, without the risk of contacting the decanted liquid or cross-contaminating the various tubes. Other features and advantages of the present invention will become apparent from the following, more detailed description, taken in conjunction with the accompanying drawings, which illustrate, by way of example, the principles of the invention.

BRIEF DESCRIPTION OF THE DRAWINGS

The accompanying drawings illustrate a preferred embodiment of the invention. In such drawings.

DETAILED DESCRIPTION OF THE PREFERRED EMBODIMENT

Figure 3:
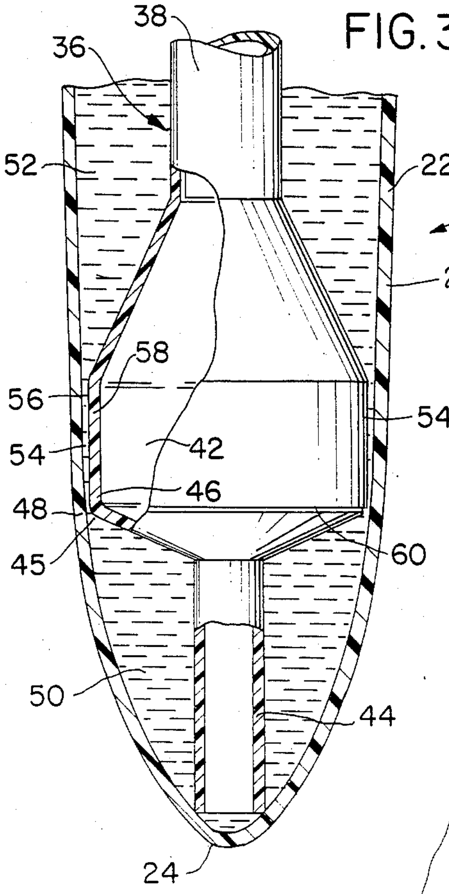
FIG. 3 is an enlarged fragmentary partially sectioned elevational view of the lower portion of the tube and pipette, taken generally on the line 3—3 of FIG. 2.
Figure 2:
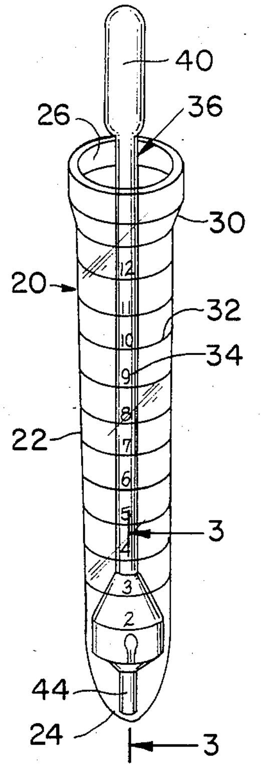
FIG. 2 is a perspective view of the pipette of FIG. 1 inserted into a tube.
Figure 5:
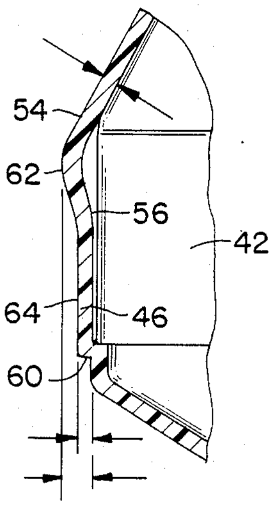
FIG. 5 is an enlarged elevational sectional view of a rib, taken generally on line 5—5 of FIG. 4.

As is shown in the drawings for purposes of illustration, the present invention is embodied in an apparatus, indicated generally by the numeral 20, for use in preparing a liquid sample for subsequent observation. As best illustrated in FIGS. 2 and 3, the apparatus 20 includes a tube 22 having a closed lower end 24, an open upper end 26, and a tapered portion 28, so that the cross-sectional area of the open end 26 is greater than that of the closed end 24. In the illustrated embodiment, a funnel section 30 further increases the area at the open end. Volume indicia, as for example, circumferential marking lines 32 and associated numerals 34, may be provided to assist in measuring precise quantities of liquid.

A pipette 36 is dimensioned for insertion into the tube 22. As used herein, a "pipette" is an elongated element preferably, but not necessarily, hollow, having isolation means for sealingly isolating a portion of liquid in the tube 22. The preferred pipette 36 includes an elongated portion 38 having an upper end closed with a resiliently compressible bulb 40 extending above the upper end 26 of the tube 22, when the pipette 36 is fully inserted into the tube 22. At its lower end, the pipette 26 includes a diametrically enlarged chamber 42 and a filling tube or stem 44 at the lowest portion of the pipette 36.

Figure 6:
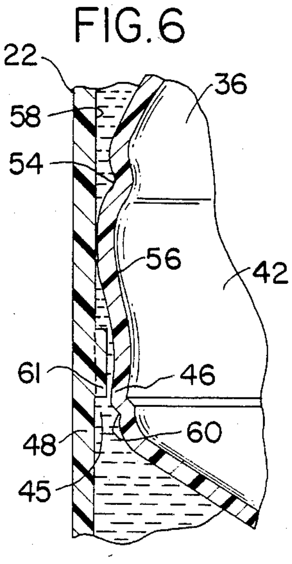
FIG. 6 is a further enlarged elevational sectional view of a detail of FIG. 3, showing a rib frictionally engaged to the tube wall.

At best illustrated in FIG. 3, the pipette 36 is inserted into the tube 22 and pushed downwardly until the lower end of the stem 44 contacts the closed end 24 of the tube 22. As illustrated in FIG. 6, with the pipette 36 in this position, there is a small gap 45, typically about 0.003 inches, between a lower edge 46 of the outer wall of the chamber 42, and the corresponding sidewall 48 of the tube 22. The presence of the gap 45 is desirable, in that it allows liquid to be forced out of an isolated volume of liquid 50 below the chamber 42 as the pipette 36 is inserted, avoiding a piston effect that would otherwise force liquid into the stem 44. This small gap 45 effectively seals the isolated volume of liquid 50 below the chamber 42 from a discarded volume of liquid 52 above the chamber 42, as the discarded volume of liquid 52 is decanted. When the tube 22 with the pipette 36 in its fully inserted position is partially inverted to decant the discarded volume of liquid 52, the surface tension of the isolated volume of liquid 50 in the gap 45 retains the isolated volume of liquid 50 without loss of liquid. Thus, used herein, the term "contacting" when applied to the positioning of surfaces refers to their proximate positioning to effect a seal, although the surfaces may not be in physical contact.

To prepare a sample of liquid using this apparatus and a standardized format, 12 ml of urine is poured into the tube 22, and the upper end 26 is covered with a snap-fitting cap (not shown). The tube 22 is placed into a centrifuge and centrifuged at 400 times the force of gravity for 5 minutes. This centrifuging process forces the denser elements of the liquid, including solid particles, toward the lower end 24 of the tube 22. The tube 22 is removed from the centrifuge, the cap is removed, and the pipette 36 is inserted in the manner illustrated in FIG. 2 until the stem 44 contacts the lower end 24 of the tube 22, thereby sealing the isolated volume of liquid 50, containing most of the solid elements, from the discarded volume of liquid 52. In the standardized format, the isolated volume of liquid 50 is 1 ml.

Because the interior of the pipette 36 is completely air filled at this point, it has a tendency to float upwardly so as to break the seal between the isolated volume of liquid 50 and the discarded volume of liquid 52. Care must be taken to avoid such floatation.

The discarded volume of liquid 52 is then decanted by partially inverting the tube 22 with the pipette 36 held in the fully inserted position to maintain the seal and prevent loss of the isolated volume of liquid 50. After the discarded volume of liquid 52 is decanted, the tube 22 and pipette 36 are returned to the upright position. The liquid remaining in the tube 22 is mixed to a generally uniform mixture by swirling the tube 22 or by using the pipette 36 as a stirring rod. Optionally, a stain may be added to the remaining liquid. The isolated volume of liquid 50 is transferred into the chamber 42 using the pipette 36 by compressing the bulb 40 to force air out of the chamber 42 through the stem 44 to create a partial vacuum in the chamber 42, and then releasing the bulb 40 to draw liquid into the chamber 42. The pipette 36 may then be removed from the tube 22 to deposit a sample of liquid on a microscope slide (not shown) for observation, by compressing the bulb 40 slightly to force a drop of liquid onto the slide.

In accordance with the invention, retention means is provided to hold the pipette 36 in its fully inserted position to maintain the stem 44 in contact with the closed end 24. The sealing contact between the lower edge 46 of the chamber 42 and the sidewall 48 of the tube 22 is maintained in spite of the tendency of the pipette 36 to float, even when the pipette 36 and the tube 22 are partially inverted to decant the discarded volume of liquid 52. Without the presence of such retention means, the person preparing the liquid sample must sometimes hold his finger against the bulb 40 to conteract the tendency of the pipette 36 to float, and must nearly always use one finger to hold the pipette 36 in place during the decanting procedure.

In a preferred embodiment of the retention means, at least one raised rib 54 is provided on an outwardly facing wall 56 of the chamber 42. The rib 54 has a height greater than the clearance between the outwardly facing wall 56 and a corresponding sidewall 58 of the tube 22, so that either the rib 54 or the outwardly facing wall 56 of the chamber 42 must deform inwardly to allow full insertion of the pipette 36 into the tube 22. In the preferred embodiment, the chamber 42 is formed of plastic having a wall thickness of about 0.015 inches. The outwardly facing wall 56 is therefore deformed inwardly by the contact of the rib 54 and the sidewall 58 of the tube 22, in the manner illustrated in FIG. 6. This inward deformation of the outwardly facing wall 56 of the chamber 42 resiliently biases the rib 54 outwardly against the sidewall 58 of the tube 22. The resulting frictional force resists the tendency of the pipette 36 to float upwardly, and also holds the pipette 36 in place to maintain the sealing contact to retain the isolated volume of liquid 50 when the tube 22 is inverted to decant the discarded volume of liquid 52.

Figure 1:
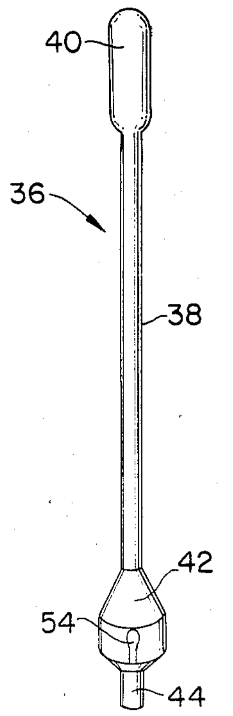
FIG. 1 is a perspective view of a pipette embodying the features of the present invention.
Figure 4:
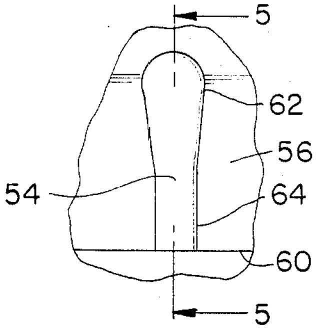
FIG. 4 is an enlarged elevational view of a portion of FIG. 1, showing detail of a rib.

Any configuration providing an increased periphery to the outer wall 56 of the chamber 42 will provide some of the benefits of the present invention, but the rib configuration is preferred. If the entire periphery of the chamber 42 is raised to give the chamber 42 a greater diameter, the frictional retention force tends to be too great and there may also be a piston effect created during insertion of the pipette 36. If only a single raised dot on the outer wall 56 is provided, it is found that the frictional force increases rapidly over a short distance of axial movement of the pipette 36 relative to the tube 22, resulting in a less desirable "feel" and a sense of positive engagement conveyed to the person performing the sampling procedures. Accordingly, the rib 54 having a raised portion elongated parallel to the axis of the pipette 36 is preferred, as illustrated in FIGS. 1 and 4.

In the preferred embodiment, the entire pipette 36 is formed in a multiple-piece die using a blow molding process. To facilitate the blow molding process, two different sections of the die (not shown) are joined near a lower end of the largest diameter portion of the chamber 42. Consequently, a circumferential flash molding 60 is usually produced on the chamber 42. It is preferred that the rib 54 connect to, and be continuous with, the flash molding 60 in the manner illustrated in FIG. 4. When the rib 54 and the flash molding 60 are continuous, any air bubbles present in the rib 54 as the part is formed from liquid plastic are forced along the length of the rib 54, into the liquid plastic at the flash molding 60, and thence out of the part through the space between the dies. Soundness and dimensional reproducibility of the pipette 36 are thereby promoted.

The rib 54 has a height which gradually increases from the end nearest the stem 44 toward the end nearest the bulb 40. This gradually increasing height allows the rib 54 to engage sidewall 58 of the tube 22 over a length of axial travel as the pipette 36 is inserted into the tube 22. This gradually increasing frictional force provides a proper "feel" to the insertion and a sense of positive engagement when the pipette 36 is fully inserted, thereby aiding the person preparing the sample in conducting the sampling.

If a numeral "1" is formed as a raised portion 61 on the inside of the sidewall 58 of the tube 22, in some rotational positions of the pipette 36 the raised rib 54 may undesirably contact the raised portion 61. In such a construction, it is preferred to configure the rib 54 as a first raised portion 62 of greater height and a second raised portion 64 of lesser height so that the second raised portion 64 provides clearance over the numeral.

At least one rib 54 is desired, but additional ribs may be provided. In the preferred embodiment, two diametrically opposed ribs, each having a height of about 0.005 inches, are provided.

A liquid sampling procedure utilizing an apparatus embodying the present invention is performed in a manner generally similar to that described previously. However, with an apparatus embodying the invention it is not necessary that the pipette 36 be held in place manually to prevent flotation, or during decanting of the discarded liquid. It will therefore be appreciated that, through the use of this invention, the sample preparation procedure may be greatly enhanced by allowing the simultaneous preparation of multiple tubes of liquid. Multiple tubes are placed into a rack, the pipettes are inserted, and then the entire rack is inverted to decant the discarded liquid from all of the tubes at one time. Whether a single tube or multiple tubes are prepared, the person conducting the sample preparation need not touch the liquid or risk cross contamination.

Although a particular embodiment of the invention is described in detail for purposes of illustration, various embodiments may be made without departing from the spirit and scope of the invention. Accordingly, the invention is not to be limited except as by the appended claims.

We claim:

1. Apparatus for use in preparing a sample of a liquid for examination and analysis, the apparatus comprising:

a tube for receiving and containing a liquid sample, said tube having a first sealing surface on an interior wall portion thereof; and an elongated pipette dimensioned for axial insertion into said tube to isolate a portion of the liquid therein, said pipette having a flexible second sealing surface thereon for sealingly contacting said first sealing surface to isolate a portion of fluid, and further having elongated peripherally enlarged surface means positioned on said second sealing surface essentially parallel to the elongated dimension of said pipette, and dimensioned for frictionally engaging the wall of said tube to maintain the sealing contact between said first sealing surface and said second sealing surface, over a short range of axial movement of the pipette as the sealing surfaces are brought into contact, said elongated peripherally enlarged surface is positioned and dimensioned on said second sealing surface which is sufficiently flexible to maintain a sealing relationship between said first and second sealing surfaces.

2. The apparatus of claim 1, wherein said pipette has a circumferential molding flash and wherein said peripherally enlarged surface means is a pair of diametrically opposed, raised ribs on said pipette, each of said ribs being elongated parallel to the axis of said pipette and each having a tapered portion whose height increases gradually with increasing distance from the end of said pipette first inserted into the tube, said ribs further being continuous with said circumferential molding flash.

3. The apparatus of claim 1, wherein said peripherally enlarged surface means is a rib elongated parallel to the long axis of said pipette.

4. The apparatus of claim 3, wherein a portion of said rib has a height that increases gradually with increasing distance from the end of said pipette first inserted into said tube.

5. The apparatus of claim 3, wherein said rib has a first raised portion of greater height and a second raised portion of lesser height.

6. The apparatus of claim 3, wherein said pipette has molding flash on its surface, and said rib is continuous with said molding flash.

7. Apparatus for use in laboratory analytical procedures to prepare a sample of a liquid for examination, comprising:

a tapered elongated tube for containing a liquid sample, said tube having a closed lower end, an open upper end, and a sidewall, the cross-sectional area of the tube adjacent the closed end being smaller than that adjacent the open end, and further having a first sealing surface on the inner side of said sidewall; and an elongated sampling pipette dimensioned for insertion into said tube, said pipette being hollow and having an upper end having a bulb and a lower end, said pipette further having:

a diametrically enlarged chamber adjacent the lower end of said pipette, said chamber having an annular resilient second sealing surface thereon for contacting said first sealing surface, whereby liquid in the bottom of said tube is isolated from the liquid in the top of said tube when said pipette is fully inserted into said tube and said first and second sealing surfaces are contacted together; and a pair of raised ribs on said second sealing surface of said chamber, said ribs being positioned parallel to the longitudinal axis of said pipette and dimensioned to frictionally engage the inner side of said sidewall over a short range of axial positionings of said pipette at about the axial position where said first and second sealing surfaces are contacted together, the frictional engagement thereby resisting the tendency of the pipette to float upwardly in the liquid, and said ribs are positioned and dimensioned on said second sealing surface which is sufficiently flexible to maintain a sealing relationship between said first and second sealing surfaces so as to maintain the seal between said first and second sealing surfaces when the tube is inverted to decant the portion of the liquid in the top of the tube.

8. The apparatus of claim 7, wherein said pipette has a circumferential flash molding, and said ribs connect with said flash molding.

9. The apparatus of claim 7, wherein said chamber is formed of plastic and has a thin wall, so that said ribs are resiliently biased against said sidewall by flexure of said wall of said chamber in the range of frictional engagement.

10. The apparatus of claim 7, wherein the greatest height of each rib is about 0.005 inches.

11. Apparatus for preparing a sample of a liquid for examination and analysis, the apparatus comprising:

a tube having a closed lower end, an open upper end, and a sidewall, and a pipette dimensioned for insertion into said tube, said pipette having sealing means thereon for isolating a volume of a liquid contained in said tube adjacent said lower end of said tube when said pipette is inserted into said tube, and a raised rib positioned on a flexible outer wall of said pipette parallel to the longitudinal axis of said pipette to retentively engage the sidewall of said tube over a short axial range when said pipette is in its inserted position, said raised rib is positioned and dimensioned on said outer wall which is sufficiently flexible to maintain a sealing relationship between said sidewall and said outer wall so that said pipette will not float upwardly when the tube contains liquid and will not fall from the tube when the tube is inverted.

* * * * *